(12) United States Patent
Missbach

(10) Patent No.: US 8,427,754 B2
(45) Date of Patent: Apr. 23, 2013

(54) DISPLAY DEVICE WITH AN ACTIVE MATRIX OF ELECTROWETTING CELLS

(75) Inventor: Robert Missbach, Kreischa/OT Barenklause (DE)

(73) Assignee: Seereal Technologies S.A., Munsbach (LU)

( * ) Notice: Subject to any disclaimer, the term of this patent is extended or adjusted under 35 U.S.C. 154(b) by 465 days.

(21) Appl. No.: 12/711,619

(22) Filed: Feb. 24, 2010

(65) Prior Publication Data

US 2010/0225986 A1 Sep. 9, 2010

(30) Foreign Application Priority Data

Mar. 3, 2009 (DE) .......................... 10 2009 001 310

(51) Int. Cl.
*G02B 1/06* (2006.01)
(52) U.S. Cl.
USPC .......................................... 359/665; 359/666
(58) Field of Classification Search .................. 359/665, 359/666
See application file for complete search history.

(56) References Cited

U.S. PATENT DOCUMENTS

2008/0129681 A1 * 6/2008 Hagood et al. ................ 345/109

FOREIGN PATENT DOCUMENTS

WO 2007/049196 A2 5/2007

* cited by examiner

*Primary Examiner* — James Jones
(74) *Attorney, Agent, or Firm* — Saul Ewing LLP

(57) ABSTRACT

The invention relates to an active matrix with data driver circuit and selection driver circuit, where the active matrix is electrically connected with the driver circuits and where it comprises electrowetting cells (EW cells) arranged in rows and columns. An EW cell comprises at least two electrodes, which are connected through at least one transistor with data lines and row lines of the driver circuits. The electrodes which are provided for controlling the EW cell are connected with the same data line and with two different control lines, where the selection driver circuit simultaneously activates the transistors which are connected with the individual selection lines by control signals and where it connects the electrodes of the respective EW cell locally so to achieve a medium voltage value.

14 Claims, 3 Drawing Sheets

DISPLAY DEVICE WITH AN ACTIVE MATRIX OF ELECTROWETTING CELLS

CROSS-REFERENCE TO RELATED APPLICATIONS

This application is based on and claims priority to German Application No. DE 10 2009 001 310.5, filed on Mar. 3, 2009, the entire contents of which are hereby incorporated fully herein by reference.

BACKGROUND OF THE INVENTION

The present invention relates to a display device with an active matrix of electrowetting cells (EW cells), where the liquids in the EW cells can be brought to a defined initial condition quickly between two value writing operations, so that fast switching times can be achieved.

The field of application of the invention includes display devices which comprise as an active matrix a controllable spatial light modulator with light modulation elements which are realised in the form of electrowetting cells. These display devices preferably serve to display three-dimensional information, in particular video sequences, autostereoscopically or holographically.

Because the EW cells serving as light modulation elements have great advantages over other types of light modulation elements, as they have e.g. greater brightness and contrast, large viewing angles and a great switching speed, they enjoy good applicability in many fields. The actual physical form of these cells must be adapted to the specific application; this regards e.g. also the control mechanisms of the EW cells. EW cells with these properties can preferably serve as elements of a controllable active matrix and be used in a display device. The design of EW cells is generally known to persons skilled in the art and shall thus only be mentioned briefly here. A simple EW cell comprises an enclosed container with a top and a bottom faceplate, which are preferably made of a transparent material, and between which two immiscible liquids form an interface. The inclination of that interface can be controlled with the help of a number of electrodes, where the control is effected by varying the voltage supplied to the electrodes. Depending on the actual electrode arrangement and control, the interface can realise the function of a prism and/or that of a lens.

When using controllable EW cells in display devices, a general problem is that—in contrast to the light modulation elements of controllable liquid crystal cells (pixels) of an LC display panel—a relative large volume of liquids must be moved when controlling the EW cells of the active matrix. In the EW cells of autostereoscopic display devices, greyscale values must be realised in a very short time in order to modulate incident light. In display panels of holographic display devices which work in real-time mode, different phase and/or amplitude values must be realised in a very short time in order to modulate incident light. In either case the electric charges representative of said values must be varied very quickly in the EW cells. In a normal LCD panel, the pixel capacitors can be subjected to a charge reversal very quickly because their capacitance is relatively small and constant. If in an LCD panel the pixel is activated for a short time by supplying a voltage to the row line, then the voltage of the pixel capacitor can be varied through the data line. If the pixel is deactivated again, the voltage in the capacitor, which is now insulated, will remain constant over the entire duration of the image representation (e.g. 16 ms) in an LCD panel, because the capacitance does not change. A new greyscale value will only be set after a certain switching time (about 2-20 ms) by way of supplying a different voltage.

In the display device with EW cells, there is also a switching time, within which the interfaces of the liquids in the EW cells adapt to a new setted control voltage. As the wetting in the EW cells changes, their capacitance will vary as well. Because the charge in the insulated electrode which is not intended to control an EW cell (cell capacitor) is constant, the voltage will change as well according to the equation $$Q = C*U \qquad (1)$$

where Q is the charge, C is the capacitance, and U is the voltage.

Therefore, the desired inclination angle of the interface and thus the voltage value of an EW cell which corresponds with this desired inclination angle cannot be determined by writing a charge which is only controlled by the voltage to the cell electrodes once. It is always necessary to take into consideration at both electrodes the actual level of the liquids which is effected by a previous switching operation. This level of the liquids, however, is often not known or cannot be determined precisely, and it is often not identical at the two electrodes either. This is why the EW cell is brought to a defined initial condition e.g. by a resetting operation between two switching operations or two addressing operations, i.e. before a desired value is written. This can be done e.g. by readjusting the supplied voltage and/or by keeping it at a constant level as long as it takes for the interface to achieve a steady state. Since the readjustment in an EW cell takes a relatively long period of time because of the volumes of the liquids to be moved, it does not make sense any more to realise the resetting operation this way.

A resetting operation here means the process of restoring a defined initial inclination of the interface in the EW cell. This means that a voltage or capacitance which is present in the EW cell after a writing operation must be reset before a new writing operation with a new value can be effected. Otherwise the newly written value will be represented wrongly in the active matrix. A reconstruction of a 3D object which results from such wrong values will then exhibit reconstruction errors.

Document WO 2007/049196 describes one possibility of a resetting operation in a display device with an active matrix of EW cells. Each EW cell here has a connection to an additional reset line. If a voltage is supplied to the reset line which is greater than the forward voltage of the diode, the EW cell will be charged at that voltage, irrespective of the writing operation. It is thus possible to initialise the resetting operation in EW cells of a certain row, while values are being written to the EW cells in the other row. One disadvantage of this type of display is that it is only possible for the EW cell to be charged at the maximum or the minimum voltage to be supplied, depending on the polarity of the diode. Charging at the maximum voltage is particularly disadvantageous in an EW cell which is not of a flat design, but which has walls. At the maximum voltage, the EW cell has the lowest capacitance and can thus only accept a very little charge. A further disadvantage is that the charge for the resetting operation must be supplied from outside to the active matrix, which thus represents an additional power loss. This is particularly critical in appliances with display devices of the described active-matrix type, which require low switching delays.

The resetting operation described above is rather disadvantageous when importance is attached to fast switching, as is required for example in the display panel of a holographic display device. It is in particular the fact that only single rows are activated that takes too long in real-time applications. In contrast, charging the electrodes at a medium potential would be much more beneficial. The EW cell then exhibits about half its maximum capacitance, which is a better starting point for writing a value compared with the prior art. Twice the voltage to be achieved must now again be supplied for maximum wetting with water. Also the achievement of the minimum voltage value up to a small remaining capacitance can be controlled much better from a maximum switching state.

SUMMARY OF THE INVENTION

The object of the present invention is to provide a display device with an active matrix of EW cells, which circumvents the disadvantages of prior art devices, and where a defined initial condition of an electric potential is achieved in the EW cells. In particular, fast switching of an EW cell between two extreme deflection angles shall be made possible. At the same time, the power loss of the active matrix shall kept low and additional power consumption for achieving the defined initial condition shall be avoided.

The present invention is based on a display device with an active matrix, at least one data driver circuit, and at least one selection driver circuit, where the active matrix is electrically connected with both the data driver circuit and the selection driver circuit, and where it comprises electrowetting cells (EW cells) which are regularly arranged in rows and columns, where each EW cell has at least two control electrodes which are connected through at least one transistor each with data lines and selection lines of the driver circuits for addressing the EW cells.

The object is solved according to this invention in that the electrodes which are provided for controlling the individual EW cell are connected with the same data line and with two different selection lines, and in that the selection driver circuit is configured such to simultaneously activate the transistors which are connected with the individual selection lines by control signals and to connect the electrodes of the respective EW cell locally. In an embodiment of the present invention, the selection driver circuit is configured such that during local connection of the electrodes an equalisation current is realised with a value at which a remaining voltage of the EW cells can be reset to a medium voltage level in one resetting operation. The medium voltage level has a value which results from an equalisation of the remaining voltage values of the two electrodes.

The selection driver circuit is further configured such that at least one controllable EW cell stripe, which comprises a number of rows of EW cells within the active matrix, is generated and activated with the help of a programmed control pattern. The selection driver circuit is configured such to execute further control patterns which are transmitted from a control and storage unit or from the system controller. The activated EW cell stripe preferably remains active until a medium voltage value is achieved in all EW cells of the EW cell stripe.

According to another embodiment of the selection driver circuit, the remaining voltages in the individual activated rows can be equalised gradually by activating individual rows of the EW cell stripe, where the equalisation of the remaining voltages can also be executed gradually. In non-activated cells of the EW cell stripe, normal writing operations of the data driver circuit can be initiated by a control pattern of the selection driver circuit. The selection driver circuit is further configured such that the EW cell stripe can be moved across the entire surface of the active matrix by activating the selection lines of an EW cell stripe. To move the cell stripe, at least one row is added to the cell stripe e.g. at the bottom, and at least one row is removed from the cell stripe e.g. at the top simultaneously, where the added row is activated by control signals for resetting the remaining voltage, and the top row is released for writing new data to the EW cells. The activation and release processes are controlled by the driver circuits.

In a further embodiment, an EW cell of the active matrix of the display device has four electrodes, of which the opposing electrodes can be controlled together. The controllable electrodes can only be connected with the two different selection lines through the transistors for a defined period of time and not until a full equalisation of potentials is achieved. This is necessary in particular when the difference between the old and the new, currently written values is very small in the entire row. The partial equalisation can be applied in EW cells with at least two electrodes.

For precise achievement of a given medium voltage value, an additional adjustment of the desired remaining voltage can be carried out simultaneously via the data line, where this voltage value can be adjusted simultaneously for multiple activated rows of EW cells.

The data lines run vertical and the selection lines run horizontal in the active matrix, or vice versa.

BRIEF DESCRIPTION OF THE DRAWINGS

Now, the device according to this invention will be described in detail in conjunction with the accompanying drawings, wherein.

DETAILED DESCRIPTION

Figure 1:
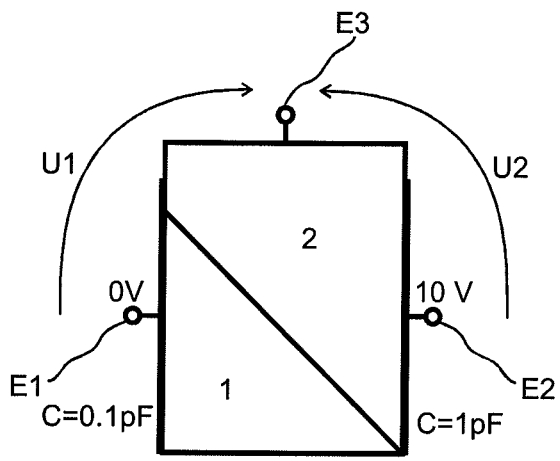
FIG. 1 is a schematic view of an EW cell in the state of maximum deflection according to the prior art.
Figure 2:
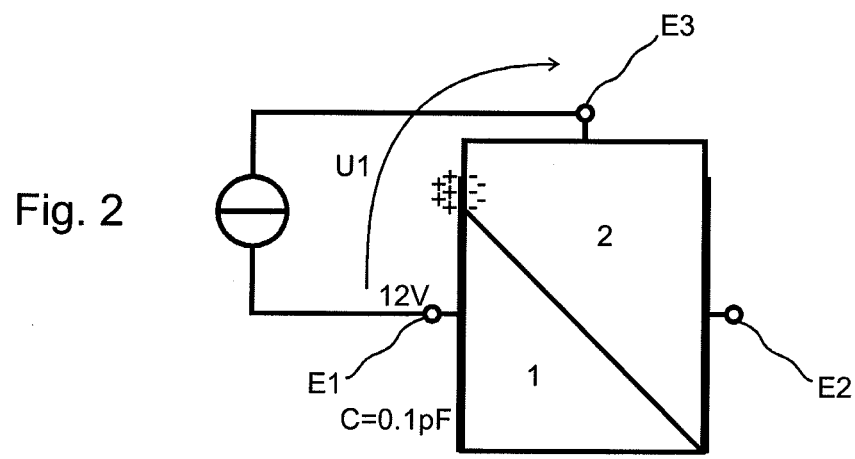
FIG. 2 is a schematic view of a writing operation in the EW cell of FIG. 1 with applied voltage and visualisation of a charge which is stored in the remaining capacitance of an electrode.
Figure 3:
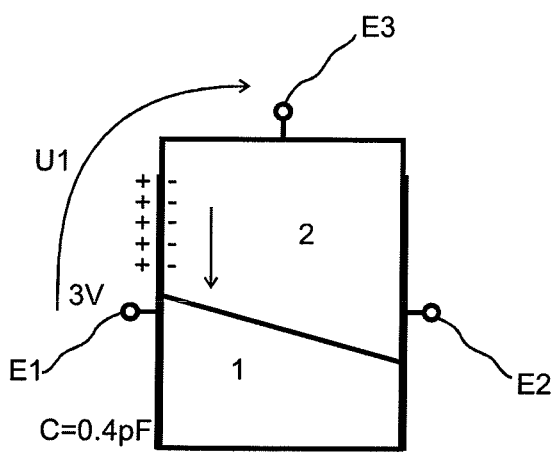
FIG. 3 is a schematic view of the EW cell of FIG. 2 after having reached a state of equilibrium, which is visualised by the even distribution of charge carriers.

FIGS. 1-3 show an electrowetting cell (EW cell) according to the prior art with two immiscible liquids 1 and 2, e.g. oil and water, whose interface is inclined as a result of an applied voltage. The EW cell is connected with three electrodes E1, E2 and E3, of which E3 is the basic electrode. The EW cells here are assumed to have a square cross-section, but other cross-sections are possible as well. The electrodes which are provided to control a writing operation, i.e. which address a cell, are arranged in opposition. The writing operation here comprises the application of voltage values which are given e.g. as a result of a hologram computation. The arched arrows in the Figures visualise the voltage between the respectively activated electrodes.

FIG. 1 illustrates schematically the least favourable initial condition for a resetting operation, i.e. a condition with a maximum deflection of an EW cell. The two voltages U1 and U2 are applied to the two electrodes E1 and E2 in relation to the basic electrode. Further, the electrode E1 has a minimum remaining capacitance of e.g. $C=0.1$ pF, and the electrode E2 has a maximum capacitance of e.g. $C=1$ pF. The initial condition before writing a new value, e.g. a hologram value, to the EW cell depends on the previously applied old value. The maximum voltage which can be supplied to the electrodes is limited by the conductors of the driver circuits which are disposed outside of the active matrix and by the transistors of the EW cells. It is assumed to be 12 V in this example. It is further assumed in this example that U1=0 V and U2=10 V for a maximum deflection (initial condition). The driver circuits comprise the data driver circuit for supplying data and the selection driver circuit for selecting the rows and EW cells to be addressed.

Because of the large number of e.g. more than 1000 rows in the active matrix of a typical display device with a screen diagonal of e.g. 19", the required charge can only be transferred for a short time via the data line to the electrodes E1 and E2 of an EW cell.

FIG. 2 is a schematic view of the EW cell of FIG. 1 with a remaining capacitance at the electrode E1 prior to a new writing operation. There is a remaining capacitance because the electrode E1 is separated by a thin insulating layer from the conductive liquid 2, which is connected electrically with the electrode E3. Since only a very small portion of the electrode E1—compared to electrode E2—is wetted with the conductive liquid 2, the remaining capacitance of 0.1 pF is much smaller than that in FIG. 1. The charge which is transferred to the electrode E1 is illustrated by five plus and five minus signs. This charge is limited by the maximum voltage (U=12 V) and the actual remaining capacitance, e.g. 0.1 pF. According to equation (1), this charge is for example Q=0.1 pF·12 V=1.2 C.

After completion of the writing operation, the electrode E1 is isolated from the voltage source. The wetting of the walls of the cell with the liquids 1 and 2 in the area of the electrodes E1 and E2, and thus the capacitance at the electrode E1 cannot change substantially during the short time of the writing operation. A new voltage is supplied to the electrode E1 during the new writing operation, so that the actual wetting angle, i.e. the inclination angle of the interface, does not correspond with the wetting angle which is represented by the new voltage. Liquid 1 thus moves down along the electrode E1 until the actual wetting angle is the same as the target wetting angle.

FIG. 3 shows the state of equilibrium that is reached. Since the charge on the insulated electrode E1 is constant, but the surface of the electrode that is wetted by the liquid 1 is reduced, the capacitance at the electrode E1 rises. As a consequence, the voltage at the insulated electrode E1 drops from 12 V after the writing operation e.g. to 3 V in the state of equilibrium. If the ratio of the maximum voltage (12 V) and the voltage which is required for a maximum desired wetting angle (10 V) is relatively small, then the liquids will only be moved so slightly during a writing operation that the state of equilibrium is reached before the target wetting angle is achieved. This is of particular importance in the unfavourable case that the liquids 1 and 2 change between a minimum wetting angle and a maximum wetting angle.

Example

QS is the charge at the beginning (after the writing operation)
QE is the charge at the end (state of equilibrium)
The aim is to achieve QS=QE
Then, according to equation (1), Q=C*U: CS*US=CE*UE $$U1*C1 = U2*C2 \quad U2 = U1*C1/C2 = 12\ V * 0.1\ pF/0.4\ pF = 3\ V$$

Given an initial voltage US=12 V after completion of the writing operation, an initial capacitance CS=0.1 pF, and a final capacitance CE=0.4 pF, the voltage in the state of equilibrium is UE=3 V. With this writing operation according to the prior art, it is not possible to realise a change between two extreme inclination angles in a single writing operation with the values of the example. A change between two extreme inclination angles can only be achieved if charges are transferred to the electrodes E1 and E2 several times. The process of transferring charges and thus that of approximating the state of equilibrium must be interrupted several times by pausing the movement of the level of the liquid. However, this reduces the frame rate of the active matrix by a factor of the number of transfer operations.

Figure 4:
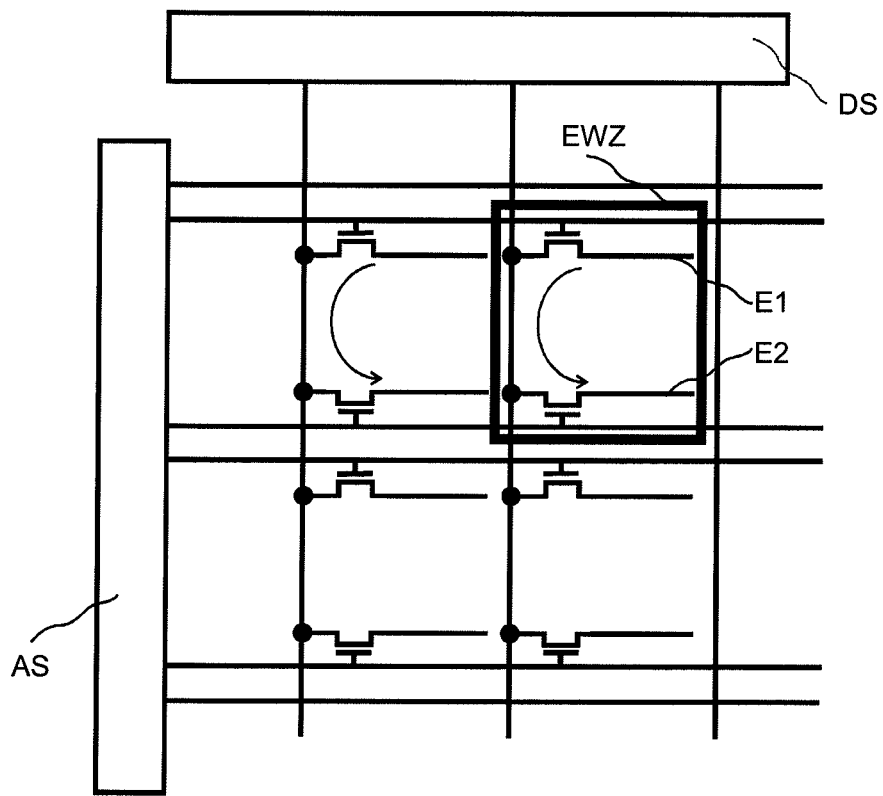
FIG. 4 is a schematic view that shows a detail of a circuit arrangement of a first embodiment of an active matrix according to this invention.
Figure 5:
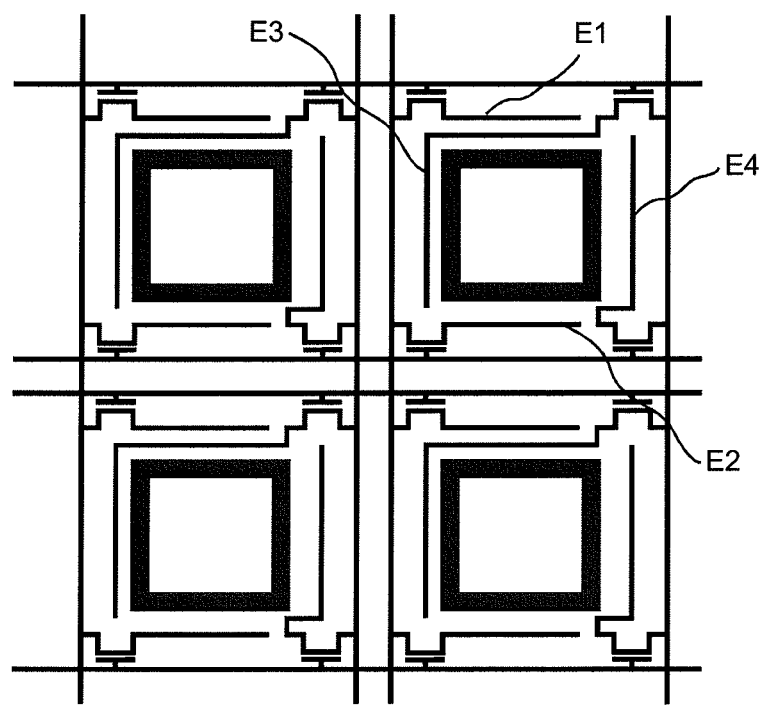
FIG. 5 is a schematic view that shows a detail of a circuit arrangement of a second embodiment of an active matrix according to this invention.

In order to circumvent the disadvantages described above, an inventive circuit arrangement is provided to interact with the control of the row lines of an active matrix of EW cells according to FIG. 4 and FIG. 5 as described above.

FIG. 4 is a schematic view that shows a detail of a circuit arrangement according to a first embodiment in an active matrix of a display device. The active matrix comprises selection lines which are arranged horizontally in pairs through which the EW cells are connected with at least one selection driver circuit AS. The data lines are arranged vertically and connect the EW cells with at least one data driver circuit DS. The driver circuits AS, DS are disposed outside of the active matrix. The drawing illustrates the control of four exemplary EW cells, where one EW cell EWZ is highlighted with a frame in the drawing. As in FIGS. 1-3, the EW cell EWZ has two electrodes E1, E2, which are disposed at two opposite sides and which serve to control the liquids, and the basic electrode (not shown). The invention is based on the idea that a resetting operation of an EW cell is realised by shorting the control electrodes, thereby equalising the remaining voltage so that a medium voltage value is achieved which results from the equalisation of the charges of the two electrodes to be controlled. For this, the EW cell EWZ is connected with a top and a bottom selection line, which is also called a row line, like all other EW cells of a row. A medium voltage value is initialised in that the two selection lines simultaneously connect the electrodes E1 and E2 locally for a short time to allow a current to flow. This connection is visualised in the drawing by an arched arrow. In doing so, advantage is taken of the special property of this type of EW cells that they only form a plane interface in the desired reset state and if the voltages are different.

Since the current is only limited by the starting resistance of the transistors of the EW cell and that of the very short section of the conductor between the electrodes, but not by the driver power or the resistance of the conductors between driver and EW cell, a very high current can flow. This has the effect that the voltages at the two electrodes are equalised in a very short time so to get the given medium voltage value.

According to a further physical form of the first embodiment, EW cell stripes can be formed in the active matrix in that a given number of rows are combined. If all selection lines of an EW cell stripe are activated simultaneously during a resetting operation, the electrodes of all EW cells of a column within this cell stripe are interconnected and their voltage levels equalise so to get a medium voltage. Due to the fact that the voltage values of multiple rows are reset at the same time, the cell stripe can remain activated until the voltages and the state of the liquids have equalised at the given medium value, while the refresh rate is only reduced slightly. However, it is also possible to activate the individual rows of the cell stripe several times, in order to achieve a gradual equalisation, while in the meantime normal writing operations are initiated in other, non-activated rows. The defined cell stripe can be scrolled through the active matrix of the display device in that rows are added at the bottom while rows are removed at the top, which can then be given new values.

FIG. 5 is a schematic view that shows a detail of a circuit arrangement according to a second embodiment of an active matrix according to this invention. Four controllable electrodes are here attached to an EW cell, where always two opposing electrodes are controlled together and are treated in accordance with the principle of the resetting operation that has been described above for FIG. 4.

According to a variant of this embodiment, the resetting operation is initialised only partly. This is achieved in that the electrode pairs are only connected for a defined period of time and not until a full equalisation of the voltages is achieved. It is a prerequisite for this case, however, that all EW cells of a row have a similar initial angle and a similar target angle. It can thereby be achieved that a medium voltage value for the resetting operation is not in the centre, but closer to the initial value.

A further variation of the resetting operation is possible by additionally adjusting the medium voltage value through the data lines. If multiple cells are activated, the voltage can thus be given an exact target value through the data lines and the external driver circuits.

The invention claimed is:

1. Display device with an active matrix, at least one data driver circuit, and at least one selection driver circuit, where the active matrix is electrically connected with both the data driver circuit and the selection driver circuit, and where it comprises electrowetting cells (EW cells) which are regularly arranged in rows and columns, where each EW cell has at least two control electrodes which are connected through at least one transistor each with data lines and selection lines of the driver circuits for addressing the EW cells, wherein the at least two control electrodes which are provided for controlling the individual EW cell are connected with the same data line and with two different selection lines, and in that the selection driver circuit is configured such to simultaneously activate the transistors which are connected with the individual selection lines by control signals and to connect the at least two control electrodes of the respective EW cell locally.

2. Display device according to claim 1, where the selection driver circuit is configured such that during local connection of the control electrodes an equalization current is realized with a value at which a remaining voltage of the EW cells can be reset to a medium voltage level in one resetting operation.

3. Display device according to claim 2, where the medium voltage value results from an equalization of the remaining voltage values of the two control electrodes.

4. Display device according to claim 2, where the selection driver circuit is configured such that at least one controllable EW cell stripe, which comprises a number of rows of EW cells within the active matrix, is generated and activated with the help of a programmed control pattern.

5. Display device according to claim 4, where the EW cell stripe remains activated until a medium voltage value is achieved in all EW cells of the EW cell stripe.

6. Display device according to claim 4, where the selection driver circuit is configured such that the remaining voltages in the individual activated rows are equalized gradually by activating individual rows of the EW cell stripe, where the equalization of the remaining voltages is also executed gradually.

7. Display device according to claim 6, where the selection driver circuit is configured such that normal writing operations of the data driver circuit are initiated in non-activated rows within the EW cell stripe by way of a corresponding control pattern.

8. Display device according to claim 6, where the selection driver circuit is configured such that the EW cell stripe is moved across the entire surface of the active matrix by activating the selection lines of the EW cell stripe.

9. Display device according to claim 8, where to move the cell stripe at least one row is added to the cell stripe and at least one row is removed from the cell stripe simultaneously by the driver circuits, where the added row is activated by control signals for resetting the remaining voltage, and where the removed row is released for writing new data to the EW cells.

10. Display device according to claim 2, where an EW cell comprises four control electrodes, of which the opposing control electrodes are controlled together.

11. Display device according to claim 2, where the control electrodes are only connected with the two different selection lines through the transistors for a defined period of time and not until a full equalization of potentials is achieved.

12. Display device according to claim 2, where for precise achievement of a given medium voltage value, an additional adjustment of the desired remaining voltage is carried out simultaneously via the data line, where this voltage value can be adjusted simultaneously for multiple activated rows of EW cells.

13. Display device according to claim 2, where the selection driver circuit is configured such to execute different control patterns which are transmitted via the selection lines from a control and storage unit or from the system controller.

14. Display device according to claim 1, where the data lines run vertical and the selection lines run horizontal in the active matrix, or vice versa.

* * * * *